(12) United States Patent
Kuribayashi et al.

(10) Patent No.: US 6,278,675 B1
(45) Date of Patent: Aug. 21, 2001

(54) WAVEFORM EQUALIZER FOR USE IN A RECORDED INFORMATION REPRODUCING APPARATUS

(75) Inventors: Hiroki Kuribayashi; Shogo Miyanabe, both of Tsurugashima (JP)

(73) Assignee: Pioneer Electronics Corporation, Tokyo (JP)

( * ) Notice: Subject to any disclaimer, the term of this patent is extended or adjusted under 35 U.S.C. 154(b) by 0 days.

(21) Appl. No.: 09/262,353

(22) Filed: Mar. 4, 1999

(30) Foreign Application Priority Data

Mar. 6, 1998 (JP) .................................................. 10-055482

(51) Int. Cl.[7] ........................................................ G11B 7/00
(52) U.S. Cl. .................................. 369/59.17; 369/124.01; 369/124.15
(58) Field of Search .................................. 369/47, 48, 49, 369/50, 54, 58, 59, 124.01, 124.15, 47.1, 47.28, 47.17, 53.1, 53.31, 53.33, 59.1, 59.17, 59.18, 59.2, 59.21

(56) References Cited

U.S. PATENT DOCUMENTS

| | | |
|---|---|---|
| 4,962,434 | 10/1990 | Matsuo . |
| 5,126,853 | 6/1992 | Mashimo et al. . |
| 5,675,569 | * 10/1997 | Yamaguchi et al. ................ 369/59 X |
| 5,999,510 | * 12/1999 | Enomoto ............................ 369/59 X |

FOREIGN PATENT DOCUMENTS

| | | |
|---|---|---|
| 0408007 | 1/1991 | (EP) . |
| 0414548 | 2/1991 | (EP) . |
| 0549030 | 6/1993 | (EP) . |
| 09044983 | 2/1997 | (JP) . |

OTHER PUBLICATIONS

Forney et al., "Combined Equalization and Coding Using Precoding", IEEE Communications Magazine, 29 (1991) Dec. No. 12, NY, pp. 25–34.

Hollmann, Henk D., "The General Solution of Write Equalization for RLL (d,k) Codes, 8097 IEEE Transactions on Informatioin Theory", 37(1991) May, No. 3, NY, pp. 856–862.

Tobita et al., "Viterbi Detection of Partial Response on a Magneto–Optical Recording Channel", 166/SPIE vol. 1663 Optical Data Storage (1992), pp. 166–173.

Search Report dated Jun. 17, 1999.

* cited by examiner

*Primary Examiner*—Muhammad Edun
(74) *Attorney, Agent, or Firm*—Fish & Richardson P.C.

(57) ABSTRACT

A waveform equalizer which can improve an S/N ratio without causing a jitter in a read signal read out from a recording medium. An amplitude level of the read signal read out from the recording medium is limited by a predetermined amplitude limitation value and, thereafter, is subjected to a filtering process.

14 Claims, 17 Drawing Sheets

FIG. 4A
RECORDING DATA
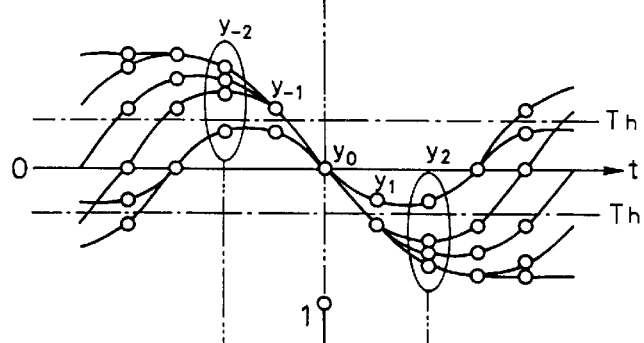
FIG. 4B
READ SIGNAL R
FIG. 4C
AMPLITUDE LIMITED
READ SIGNAL $R_{LIM}$
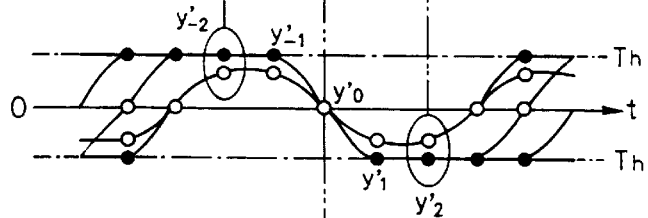
FIG. 4D
EQUALIZATION CORRECTED
READ SIGNAL $R_H$
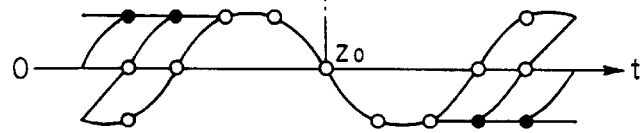

FIG.12A R 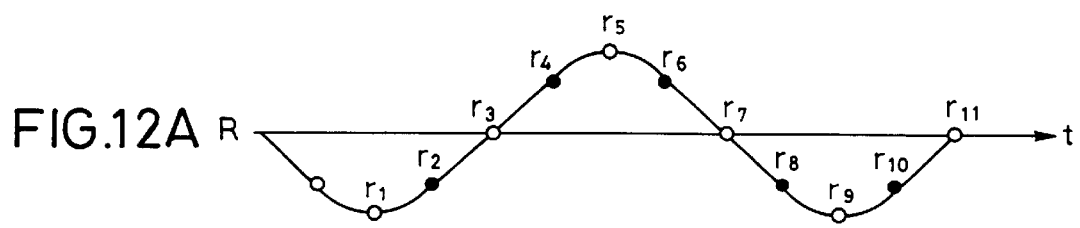
FIG.12B Rb 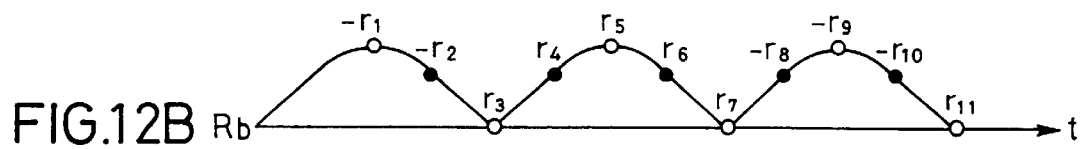
FIG.12C Rc 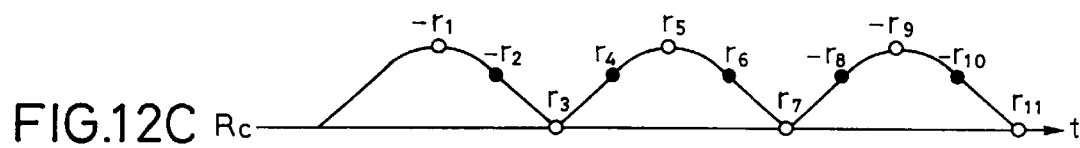
FIG.12D Rd 
FIG.12E Re 
FIG.12F Rf 
FIG.12G Rg 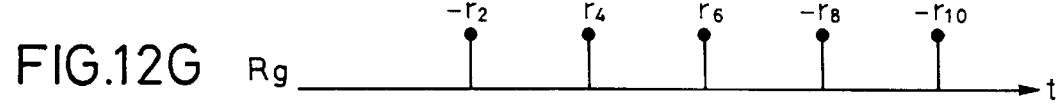

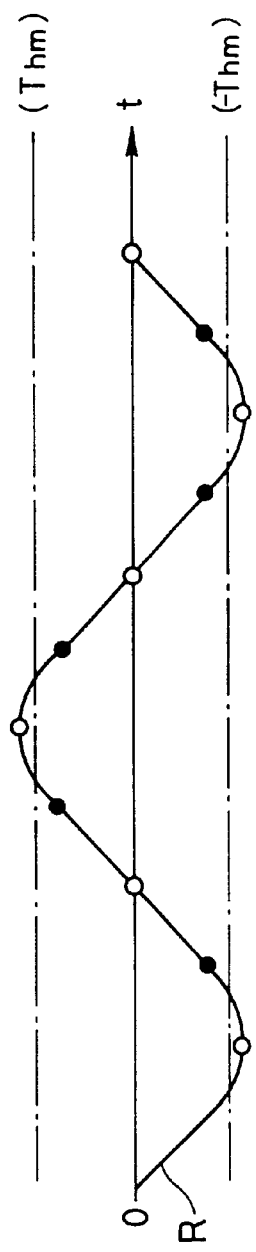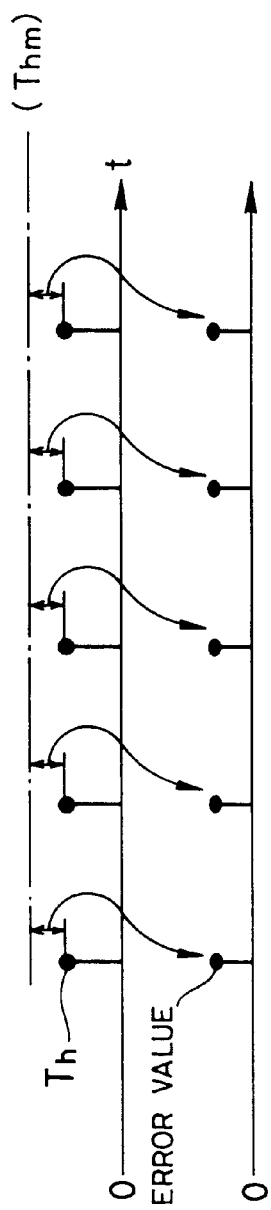
FIG.14A
FIG.14B

510

| ADDRESS | DATA |
|---------|------|
| −128 | −Th |
| −127 | −Th |
| −126 | −Th |
| ⋮ | ⋮ |
| −Th−1 | −Th |
| −Th | −Th |
| −Th+1 | −Th+1 |
| ⋮ | ⋮ |
| −2 | −2 |
| −1 | −1 |
| 0 | 0 |
| 1 | 1 |
| 2 | 2 |
| ⋮ | ⋮ |
| Th−1 | Th−1 |
| Th | Th |
| Th+1 | Th |
| ⋮ | ⋮ |
| 126 | Th |
| 127 | Th |

…

WAVEFORM EQUALIZER FOR USE IN A RECORDED INFORMATION REPRODUCING APPARATUS

BACKGROUND OF THE INVENTION

1. Field of the Invention

The invention relates to a waveform equalizer for use in a recording information reproducing apparatus for reproducing recording information from a recording medium.

2. Description of Related Art

To improve the S/N ratio of a read signal read out from a recording medium on which digital data has been recorded at a high density, there is a known technique to perform a waveform equalization by executing a filtering process to emphasize high frequency components for the read signal.

Although an improvement rate of the S/N ratio can be raised as a degree of emphasis of the high frequency components for the read signal is increased, there is a problem such that if the high frequency components is excessively emphasized, an intersymbol interference increases and a jitter contrarily occurs.

The invention has beem made to solve this problem and it is an object of the invention to provide a waveform equalizer which can improve an S/N ratio without causing a jitter in a read signal read out from a recording medium.

OBJECTS AND SUMMARY OF THE INVENTION

According to the invention, there is provided a waveform equalizer for obtaining an equalization correction read signal by performing a waveform equalization to a read signal read out from a recording medium, comprising: amplitude limiting means for obtaining an amplitude limitation read signal by limiting an amplitude level of the read signal by a predetermined amplitude limitation value; and a filter for outputting a signal obtained by performing a filtering process to the amplitude limitation read signal as an equalization correction read signal.

BRIEF DESCRIPTION OF THE DRAWINGS

FIGS. 4A to 4D are diagrams showing the preventing operation of the occurrence of a jitter by the amplitude limiting circuit 51;

FIGS. 12A to 12G are diagrams showing examples of operation waveforms in an amplitude limitation value generating circuit 511 shown in FIG. 11;

FIGS. 14A and 14B are diagrams showing examples of operation waveforms in the amplitude limiting circuit 51 shown in FIG. 13;

DETAILED DESCRIPTION OF THE PREFERRED EMBODIMENTS

Embodiments of the invention will be described hereinafter.

Figure 1:
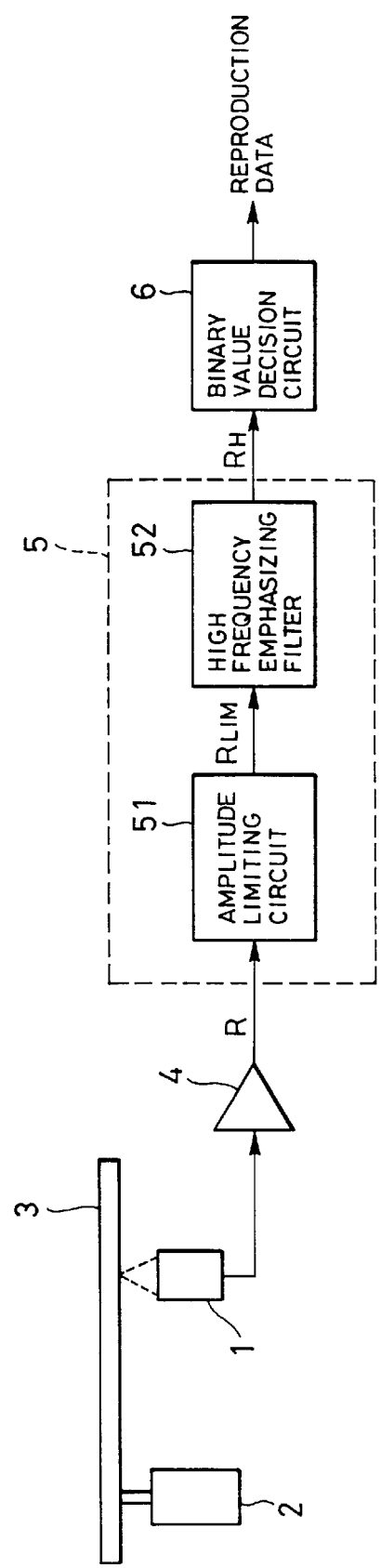
FIG. 1 is a diagram showing a construction of a recording information reproducing apparatus having a waveform equalizer according to the invention.

FIG. 1 is a diagram showing a construction of a recording information reproducing apparatus having a waveform equalizer of the invention.

In FIG. 1, a pickup 1 reads recording information recorded on a recording disk 3 which is rotated by a spindle motor 2 and supplies a read signal obtained to an amplifier 4. The amplifier 4 amplifies the read signal to a desired level and supplies an obtained read signal R to a waveform equalizer 5.

Figure 2:
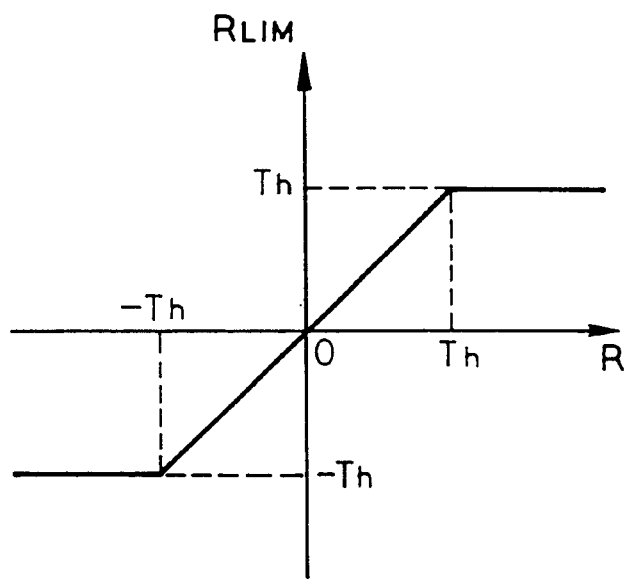
FIG. 2 is a diagram showing an example of input/output characteristics in an amplitude limiting circuit 51.
Figure 3:
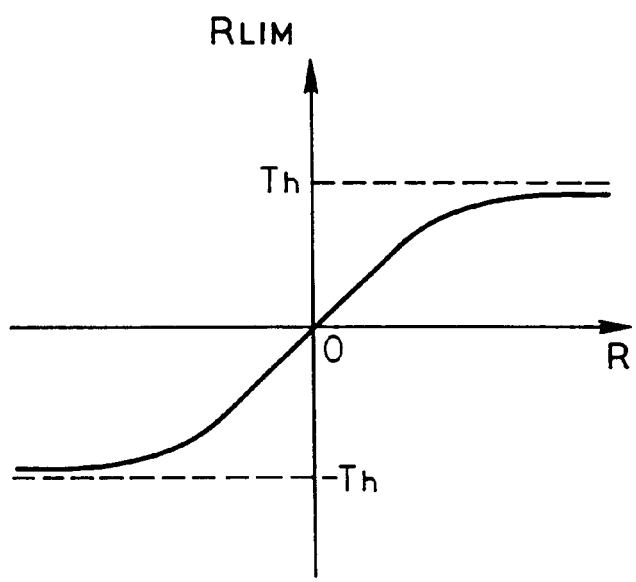
FIG. 3 is a diagram showing another example of input/output characteristics in the amplitude limiting circuit 51.

An amplitude limiting circuit 51 in the waveform equalizer 5 converts a signal level of the read signal R in accordance with input/output characteristics as shown in FIG. 2 or 3, thereby performing amplitude limitation to the read signal R and supplying an obtained amplitude limitation read signal $R_{LIM}$ to a high-frequency emphasizing filter 52.

In the case where the amplitude limiting circuit 51 has the characteristics as shown in FIG. 2, when the signal level of the read signal R is smaller than a predetermined amplitude limitation value $T_h$ and is larger than an amplitude limitation read value $-T_h$, the signal level of the read signal R is directly generated as an amplitude limitation signal $R_{LIM}$. When the signal level of the read signal R is larger than the amplitude limitation value $T_h$, the amplitude limitation value $T_h$ itself is generated as an amplitude limitation read signal $R_{LIM}$. When the signal level of the read signal R is smaller than the amplitude limitation value $-T_h$, the amplitude limitation value $-T_h$ itself is generated as an amplitude limitation read signal $R_{LIM}$.

When the amplitude limiting circuit 51 has the characteristics as shown in FIG. 3, an amplitude limitation of the read signal R is performed in accordance with nonlinear saturation characteristics in which the signal level is saturated at the amplitude limitation values $T_h$ and $-T_h$.

The high-frequency emphasizing filter 52 emphasizes the level of high frequency components of the amplitude limitation read signal $R_{LIM}$ supplied from the amplitude limiting circuit 51 and supplies a resultant signal as an equalization correction read signal $R_H$ to a binary value decision circuit 6. The binary value decision circuit 6 discriminates whether the signal level of the equalization correction read signal $R_H$ corresponds to either one of the logical levels "1" and "0", and generates a result of the discrimination as reproduction data.

The operation of the waveform equalizer 5 will now be described.

Reproducing characteristics of the recording information reproducing system as shown in FIG. 1 are LPF (low pass filter) characteristics in which a cut-off wavelength is determined by $$\lambda/2NA$$

where $\lambda$ represents the wavelength of a light source in the pickup 1, and NA represents the numerical aperture of an objective lens in the pickup 1.

In the case of DVD, for example, in order to increase a recording density, a signal of a shortest recording wavelength, that is, a signal corresponding to a run length of 3T (T denotes a bit interval of an information data series) in an 8/16 modulation is set to a value near the cut-off wavelength in the reproducing characteristics. The level of the read signal corresponding to the run length 3T, consequently, decreases.

In order to improve an S/N ratio for the signal of the run length 3T, the high frequency components corresponding to the signal of the run length 3T are raised by the high-frequency emphasizing filter 52.

If an excessive high-frequency emphasis is made by the high-frequency emphasizing filter 52, an intersymbol interference occurs and, contrarily, a jitter occurs. In the waveform equalizer of the invention, however, the amplitude limiting circuit 51 is provided to prevent the occurrence of the jitter.

FIGS. 4A to 4D are diagrams showing an operation principle of preventing the occurrence of the jitter due to the amplitude limiting circuit 51, with respect to a case of reproducing data recorded by using an RLL (Run Length Limited) code in which the minimum inversion interval is equal to 3T as in the case of the 8/16 modulation used in the DVD system.

In the recording data, three or more "1"s or "−1"s of the recording data continue invariably since the minimum inversion interval is equal to 3T. Therefore, when the data is inverted from "1" to "−1" between $D_{-1}$ and $D_1$, $D_{-2}$ and $D_{-3}$ are determined to be "1" and $D_2$ and $D_3$ are determined to be "−1". It is shown that each of the data of $D_{-4}$ and before and the data of $D_4$ and after shown by X can be equal to either "1" or "−1".

As a waveform of the read signal obtained when the recording data is read, although a number of patterns exist according to combinations of peripheral recording data patterns (each of the data of $D_{-4}$ and before and the data of $D_4$ and after is equal to either "1" or "1"), it is assumed that a value $y_0$ at the zero-cross point of the waveform in any case is converged to zero (that is, the intersymbol interference (jitter) is equal to zero).

Figure 5:
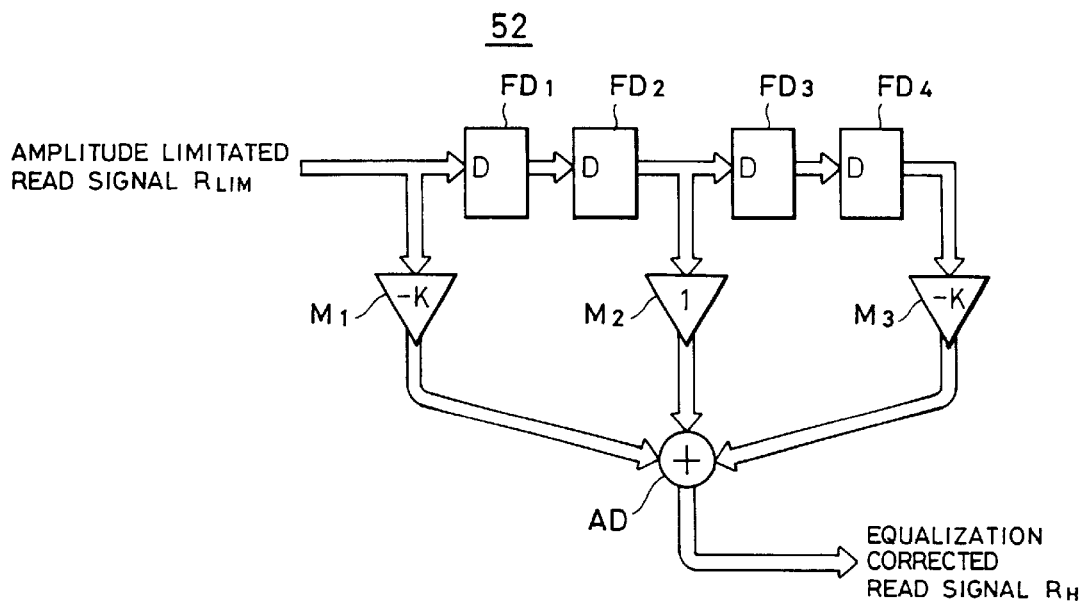
FIG. 5 is a diagram showing an example of an FIR filter as a high-frequency emphasizing filter 52.

It is now assumed that the high-frequency emphasizing filter 52 is an FIR (Finite Impulse Response) filter as shown in FIG. 5.

The FIR filter shown in FIG. 5 is what is called a cosine equalizer comprising: unit delay elements $FD_1$ to $FD_4$; coefficient multipliers $M_1$ to $M_3$ each having multiplication coefficients $\{-k, 1, -k\}$; and an adder AD for generating a sum of outputs of the coefficient multipliers $M_1$ to $M_3$ as an equalization correction read signal $R_H$.

In this case, a signal $z_0$ obtained when the FIR filter executes the high-frequency emphasis at the zero-cross point is $$z_0 = (-k) \cdot y_{-2} + y_0 + (-k) \cdot y_2$$

where $y_{-2}$ represents the read signal level at the second position away from the position just after the zero-cross point, $y_0$ represents the read signal level at the zero-cross point, and $y_2$ represents the read signal level at the second position away from the position just before the zero-cross point.

As shown in the various waveforms of the read signal R in FIGS. 4A to 4D, however, since possible values of $y_{-2}$ and $y_2$ vary according to the peripheral recording data patterns, if the high-frequency emphasis according to the above equation is simply performed, influences by variations in $y_{-2}$ and $y_2$ appear as they are as an intersymbol interference.

The amplitude limitation is performed to the read signal R in accordance with the amplitude limitation values $T_h$ and $-T_h$ by the amplitude limiting circuit 51, thereby forcibly suppressing the variations in $y_{-2}$ and $y_2$ as shown by $y'_{-2}$ and $y'_2$. The occurrence of a variation in $z_0'$ (jitter) can be prevented by executing the following arithmetic operation by using the signals $y'_{-2}$ and $y'_2$.

$$z_0' = (-k) \cdot y'_{-2} + y_0 + (-k) \cdot y'_2$$

The operation enables a sufficient high-frequency emphasis to be executed by the high-frequency emphasizing filter 52 without causing an intersymbol interference.

The absolute value $T_h$ in the amplitude limitation values $T_h$ and $-T_h$ is set to a value which is larger than the read signal level of the run length 3T as a shortest wavelength and is smaller than the read signal level of 4T whose run length is the second shortest.

Figure 6:
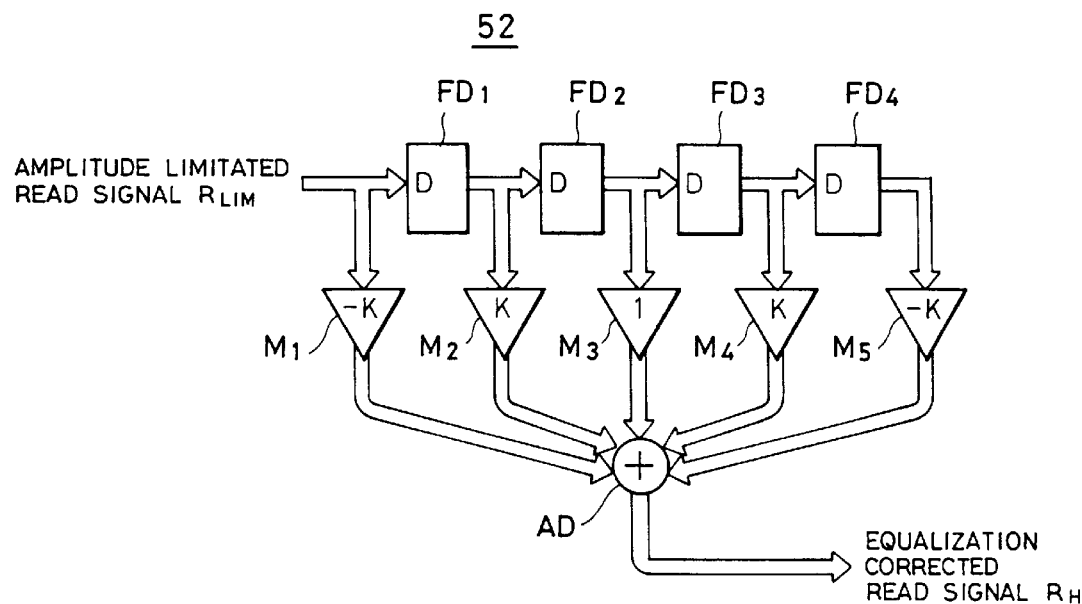
FIG. 6 is a diagram showing another example of an FIR filter as high-frequency emphasizing filter 52.

As a high-frequency emphasizing filter 52, an FIR filter having tap coefficients of $(-k, k, 1, k, -k)$ as shown in FIG. 6 is actually used. The FIR filter shown in FIG. 6 is what is called a cosine equalizer comprising: the unit delay elements $FD_1$ to $FD_4$; coefficient multipliers $M_1$ to $M_5$ each having multiplication coefficients $\{-k, k, 1, k, -k\}$; and the adder AD for generating a sum of outputs of the coefficient multipliers $M_1$ to $M_5$ as an equalization correction read signal $R_H$.

According to the high-frequency emphasizing filter 52 having the construction, the equalization correction read signal $R_H$ which is generated at the zero-cross time point is obtained as follows.

$$R_H = (-k) \cdot y'_{-2} + k \cdot (y'_{-1}) + y'_0 + k \cdot (y'_1) + (-k) \cdot y'_2$$
$$= y'_0 + k(y'_{-1} - y'_{-2}) + k(y'_1 - y'_2)$$

If the conditions of $y'_{-1} = y'_{-2}$ and $y'_1 = y'_2$ are satisfied, the intersymbol interference does not occur irrespective of the value of the coefficient k, that is, an emphasis amount of the high frequency components.

As mentioned above, the waveform equalizer 5 according to the invention has the construction such that, after performing the amplitude limitation to the read signal R by a predetermined amplitude limitation value, a filtering process by the high-frequency emphasizing filter 52 is executed. In this case, the amplitude limitation value is set to a value which is larger than the signal level of the shortest recording wavelength obtained when the recording data having the shortest run length (recording data having the run length of 3T) is read and is smaller than the read signal level obtained when the recording data having the second shortest run length (recording data having the run length of 4T) is read.

With this construction, therefore, a variation in the read signal levels before and after the zero-cross point in the read signal which becomes a cause of the occurrence of the intersymbol interference at the time of the high-frequency emphasis can be forcibly suppressed. Even if a sufficient high-frequency emphasis is executed by the high-frequency emphasizing filter 52, therefore, no intersymbol interference occurs.

The internal construction of the waveform equalizer 5 is not limited to that shown in FIG. 1.

Figure 7:
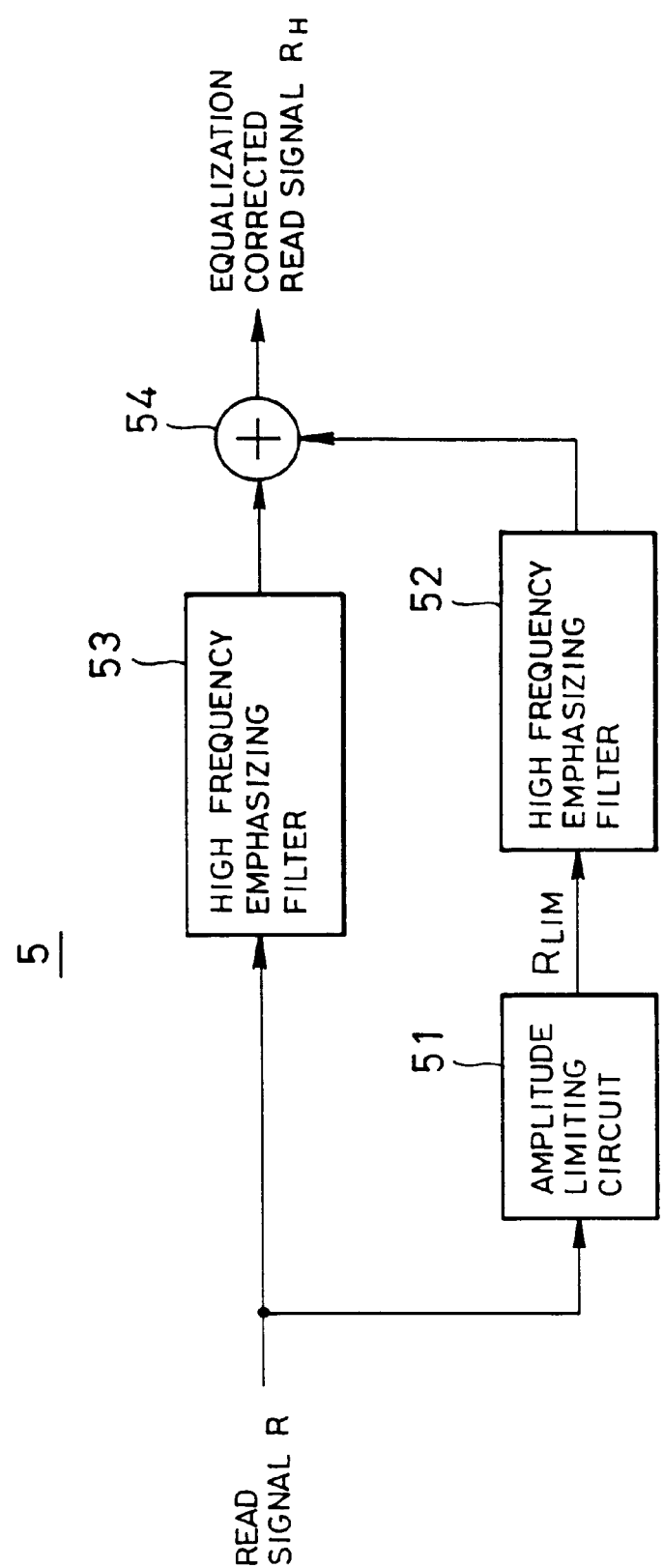
FIG. 7 is a diagram showing another example of an internal construction of a waveform equalizer 5.

FIG. 7 is a diagram showing another construction of the waveform equalizer 5.

In FIG. 7, the signal processes by the amplitude limiting circuit 51 and the high-frequency emphasizing filter 52 are the same as those shown in FIG. 1.

In the waveform equalizer shown in FIG. 7, however, a second high-frequency emphasizing filter 53 for executing a high-frequency emphasis to the read signal R which is supplied from the amplifier 4 is further provided. A value obtained by adding high-frequency emphasis read signals generated from the high-frequency emphasizing filters 52 and 53 by an adder 54 is supplied as an equalization correction read signal $R_H$ to the binary value decision circuit 6.

Figure 8:
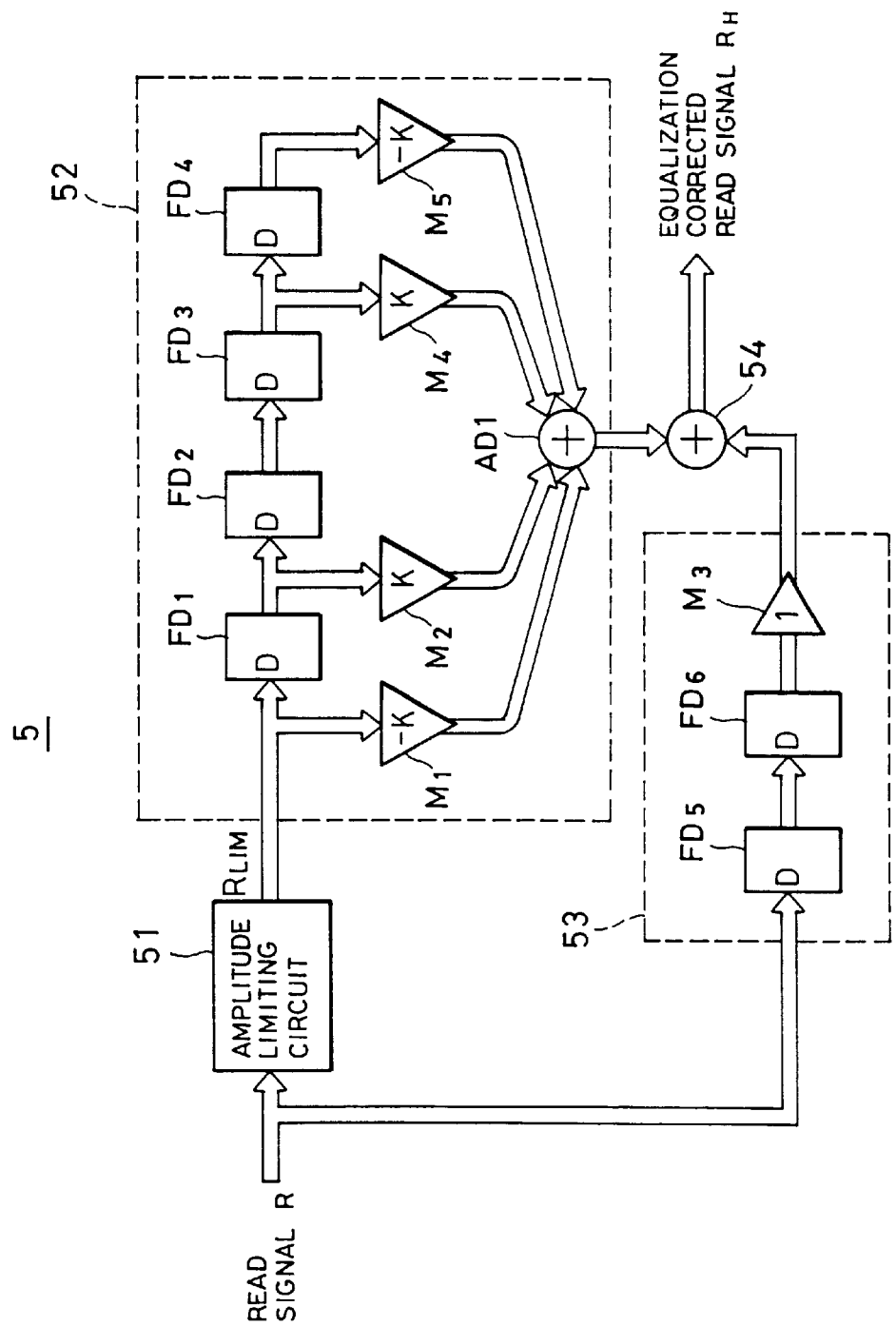
FIG. 8 is a diagram showing a specific construction of the waveform equalizer 5 shown in FIG. 7.

FIG. 8 is a diagram showing a specific example of the waveform equalizer 5 shown in FIG. 7.

In FIG. 8, the high-frequency emphasizing filter 52 is realized by an FIR filter of tap coefficients (−k, k, 0, k, −k), comprising: the unit delay elements $FD_1$ to $FD_4$; the coefficient multipliers $M_1$, $M_2$, $M_4$, and $M_5$ each having multiplication coefficients {−k, k, k, −k}; and the adder AD for generating a sum of outputs of the coefficient multipliers.

A principle of preventing the occurrence of the jitter in the invention is to forcibly suppress variations in $y_{-2}$ and $y_2$ in FIGS. 4A to 4D by limiting the amplitude of the read signal by the amplitude limiting circuit 51. In this case, since the signal level $y_0$ at the zero-cross point is equal to almost zero, the signal levels before and after the amplitude limitation do not change.

The effect of the prevention of the jitter occurrence by the amplitude limiting circuit 51 can also be obtained by constructing in a manner such that the coefficient multiplication which is executed by the coefficient multiplier $M_3$ in FIG. 6 is performed by the high-frequency emphasizing filter 53 as shown in FIG. 8 and a result is added (adder 54) to an output of the high-frequency emphasizing filter 52.

Although the case where there is no intersymbol interference in the read signal R and $y_0$ is converged to zero has been described with reference to FIGS. 4A to 4D, when the intersymbol interference exists, it is also possible to construct such that the intersymbol interference is eliminated by executing a moderate high-frequency emphasis by the high-frequency emphasizing filter 53 shown in FIG. 8 and a signal in which $y_0$ is converged to zero is formed and added to an output of the high-frequency emphasizing filter 52.

According to the construction of the waveform equalizer 5 shown in FIG. 1, since the signal level in the low frequency components is limited by the amplitude limiting circuit 51, when the high-frequency emphasis is increased, there is a case that the signal level in the low frequency becomes lower than the signal level in the high frequency. With the construction shown in FIG. 8, however, the signal level in the low frequency is not decreased by the amplitude limiting circuit 51, so that its information reproducing accuracy is higher than that shown in FIG. 1.

Figure 9:
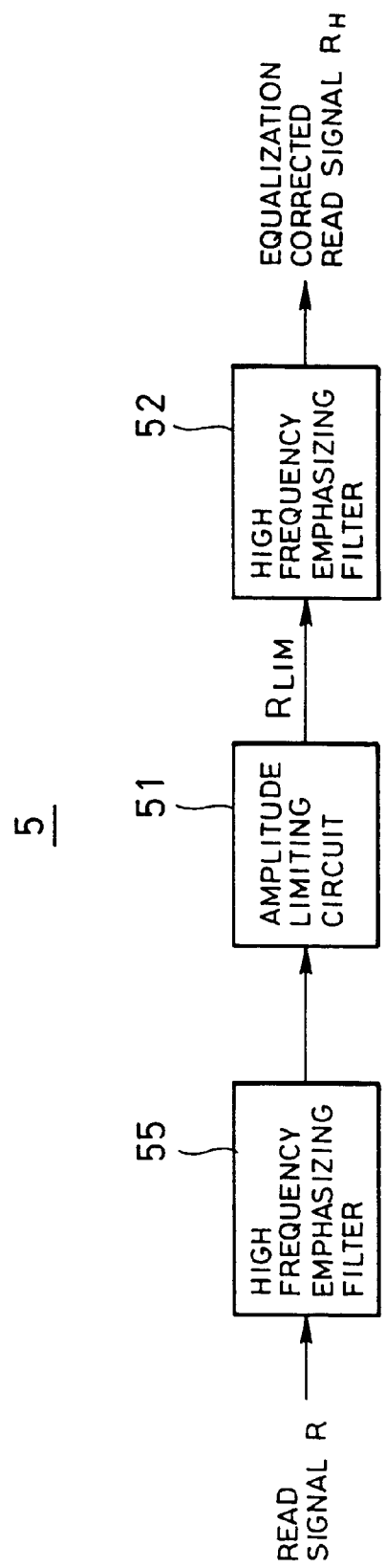
FIG. 9 is a diagram showing another example of an internal construction of a waveform equalizer 5.

Further, as a waveform equalizer 5, as shown in FIG. 9, a high-frequency emphasizing filter 55 for performing a high-frequency emphasis to the read signal R which is supplied from the amplifier 4 can be also provided at the front stage of the waveform equalizer 5 in FIG. 1 so as to preliminarily eliminate the intersymbol interference included in the read signal R.

Figure 10:
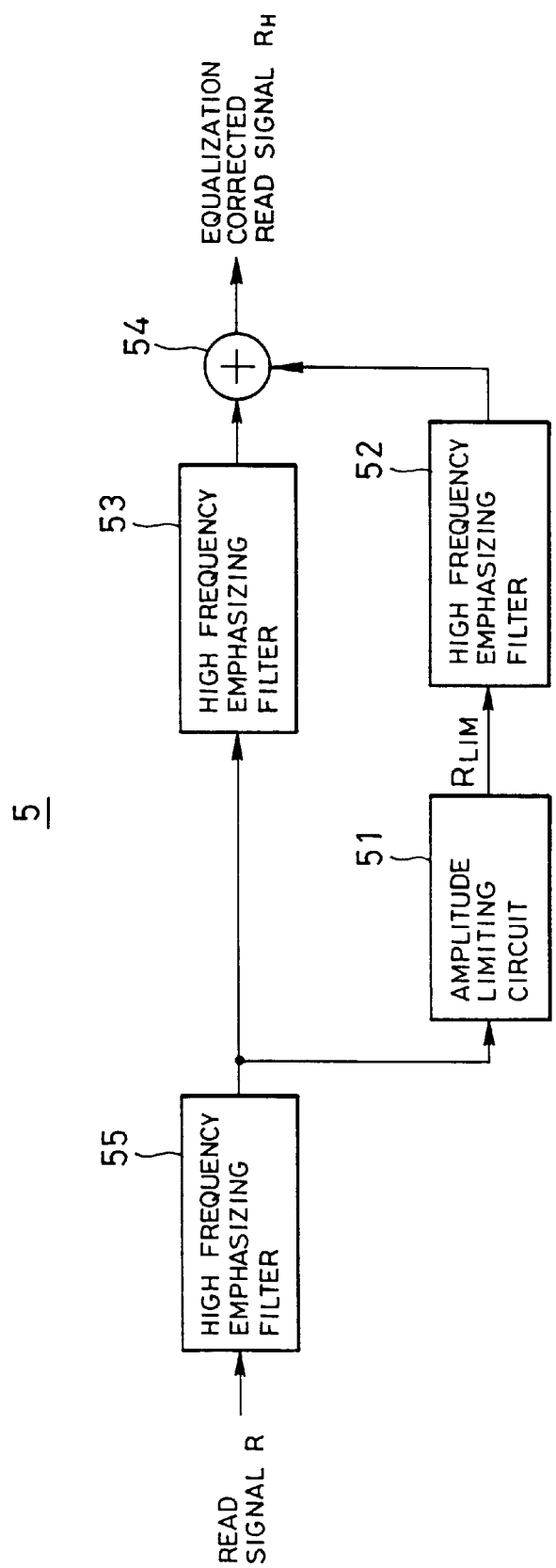
FIG. 10 is a diagram showing another example of an internal construction of a waveform equalizer 5.

Furthermore, as shown in FIG. 10, the waveform equalizer 5 can also have the high-frequency emphasizing filter 55 at the front stage of the waveform equalizer 5 in FIG. 7. In this case, the high-frequency emphasizing filter 55 is used to raise the level of the read signal corresponding to the run length of 3T, that is, the signal having the shortest wavelength when the level decreases extremely.

Although the embodiment has been described on the assumption that the amplitude limitation values $T_h$ and $-T_h$ in the amplitude limiting circuit 51 are set to predetermined fixed values, the amplitude limitation values can be also automatically formed according to the level of the read signal R.

Figure 11:
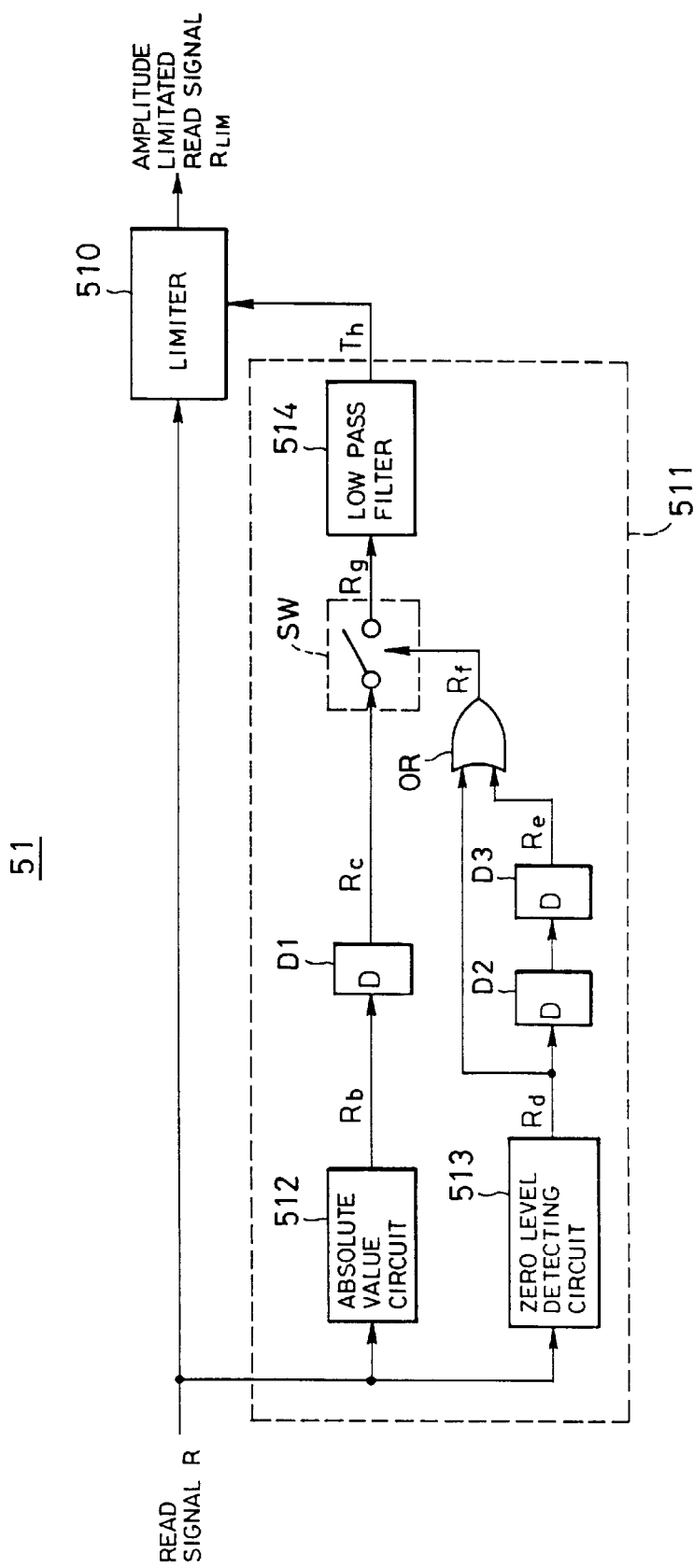
FIG. 11 is a diagram showing an example of an internal construction of the amplitude limiting circuit 51.

FIG. 11 is a diagram showing an internal construction of the amplitude limiting circuit 51 formed in view of the above point.

In FIG. 11, an amplitude limitation value generating circuit 511 obtains an average of absolute values of read signal levels at sampling points closet to the zero-cross point in the read signal R and supplies the average as an amplitude limitation value $T_h$ to a limiter 510. The limiter 510 obtains the amplitude limitation read signal $R_{LIM}$ by executing an amplitude limitation to the read signal R on the basis of the amplitude limitation value $T_h$.

The amplitude limitation value generating circuit 511 comprises an absolute value circuit 512, a zero level detecting circuit 513, a low pass filter 514, flip-flops D1 to D3, an OR gate OR, and a switch SW. FIGS. 12A to 12G show examples of internal operation waveforms of the amplitude limitation value generating circuit 511 having the construction.

The absolute value circuit 512 in the amplitude limitation value generating circuit 511 obtains an absolute value of the read signal R and supplies the absolute value as a read signal absolute value $R_b$ to the flip-flop D1. The flip-flop D1 supplies a value obtained by delaying the read signal absolute value $R_b$ only by one sampling period as a delay read signal absolute value $R_c$ to the switch SW. Only when the read signal R is set to the zero level, the zero level detecting circuit 513 generates a pulse signal $R_d$ of the logical level "1". The flip-flops D2 and D3 supply a signal obtained by delaying the pulse signal $R_d$ only by two sampling periods as a delay pulse signal $R_e$ to the OR gate OR. The OR gate OR generates a switch on signal $R_f$ of the logical level "1" only for a period of time during which either the pulse signal $R_d$ or the delay pulse signal $R_e$ has the logical level "1" and supplies the switch on signal $R_f$ to the switch SW. The switch SW is held in an ON state as long as the switch on signal $R_f$ of the logical level "1" is supplied and supplies the delay read signal absolute value $R_c$ to the low pass filter 514. The low pass filter 514 obtains an average value of the delay read signal absolute values $R_c$ and supplies the average value as an amplitude limitation value $T_h$ to the limiter 510.

With this construction, the amplitude limitation value generating circuit 511 sets the average of absolute values $\{-r_2, r_4, r_6, -r_8, -r_{10}\}$ of sampling values $\{r_2, r_4, r_6, r_8, r_{10}\}$ which are the closest to the zero-cross time point among sampling values {$r_1$ to $r_{11}$} in the read signal R shown in FIGS. 12A to 12G to the amplitude limitation value $T_h$.

Figure 13:
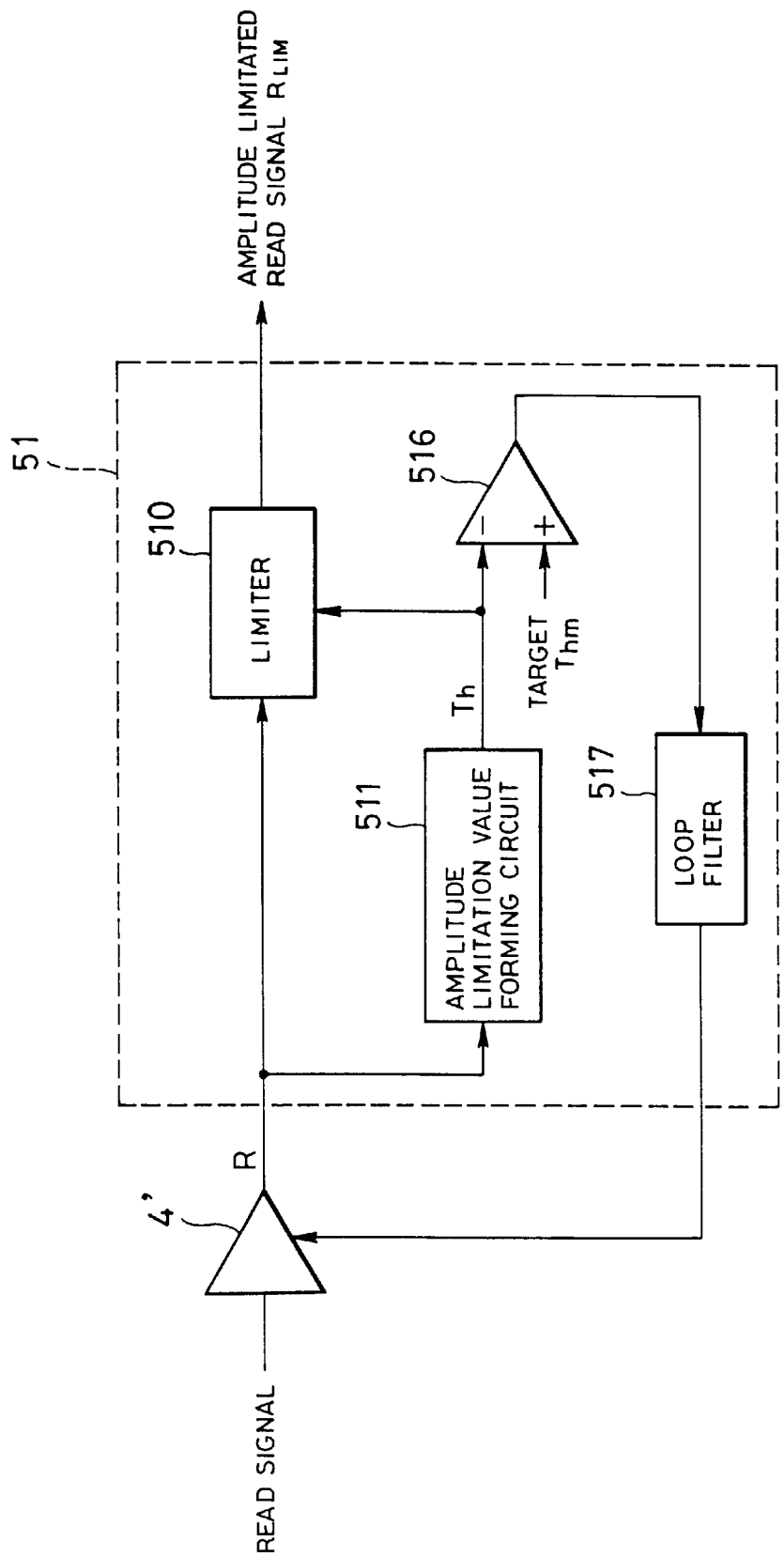
FIG. 13 is a diagram showing another example of an internal construction of the amplitude limiting circuit 51.

The amplitude limiting circuit 51 is not limited to that shown in FIG. 11 but can also have a construction as shown in FIG. 13.

In the amplitude limiting circuit 51 shown in FIG. 13, while executing the amplitude limitation to the read signal by the amplitude limitation value $T_h$ obtained by the amplitude limitation value generating circuit 511 in a manner similar to the construction shown in FIG. 11, a feedback control is performed so that the amplitude limitation value $T_h$ is converged to a predetermined target amplitude limitation value $T_{hm}$.

That is, an error value between the amplitude limitation value $T_h$ and the target amplitude limitation value $T_{hm}$ is obtained by a subtractor 516 and a loop filter 517 and the read signal is amplified by a gain based on the error value. Namely, in place of the amplifier 4 shown in FIG. 1, a gain variable amplifier 4' as shown in FIG. 13 is used.

FIGS. 14A and 14B are diagrams showing internal operation waveforms in the case where the amplitude limitation value $T_h$ obtained by the amplitude limitation value generating circuit 511 is less than the target amplitude limitation value $T_{hm}$. A gain in the gain variable amplifier 4' is in a short state. In this case, therefore, the loop filter 517 generates a positive error value and a feedback control in the direction of increasing the gain of the gain variable amplifier 4' is executed. By this operation, the amplitude level of the read signal R becomes high as a whole.

Figure 15A:
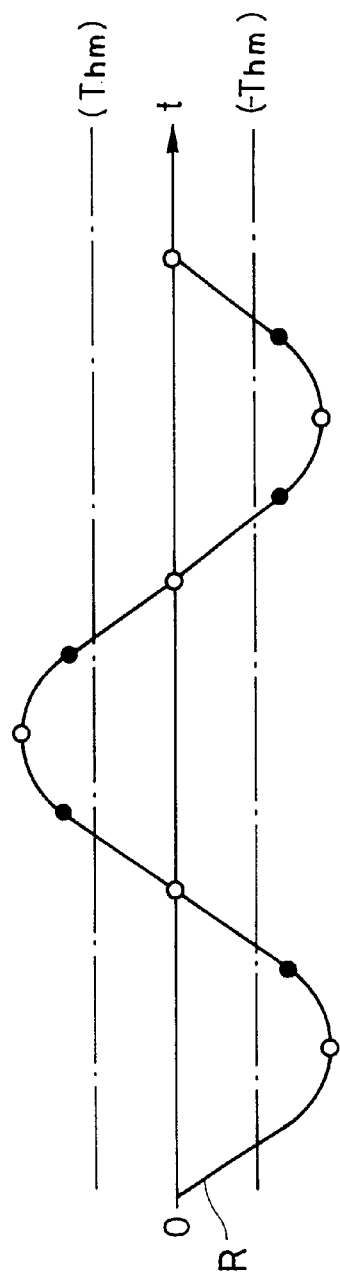
FIGS. 15A and 15B are diagrams showing examples of operation waveforms in the amplitude limiting circuit 51 shown in FIG. 13.
Figure 15B:
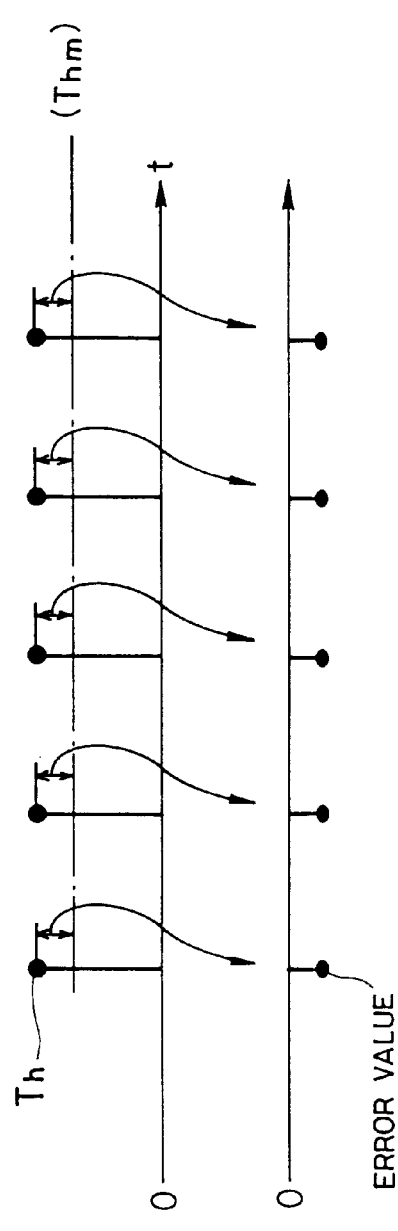

On the other hand, FIGS. 15A and 15B are diagrams showing internal operation waveforms when the amplitude limitation value $T_h$ obtained by the amplitude limitation value generating circuit 511 exceeds the target amplitude limitation value $T_{hm}$. The gain of the gain variable amplifier 4' is in an excessive state. In this case, therefore, the loop filter 517 generates a negative error value and a feedback control in the direction of reducing the gain of the gain variable amplifier 4' is executed. By the operation, the amplitude level of the read signal R becomes small as a whole.

In the embodiment shown in FIG. 13, the limiter 510 uses the amplitude limitation value $T_h$ obtained by the amplitude limitation value generating circuit 511. In place of the amplitude limitation value $T_h$, the target amplitude limitation value $T_{hm}$ can be also used.

The internal construction of the amplitude limitation value generating circuit 511 is not limited to that shown in FIG. 11. For example, a construction shown in FIG. 16 can be also employed.

Figure 16:
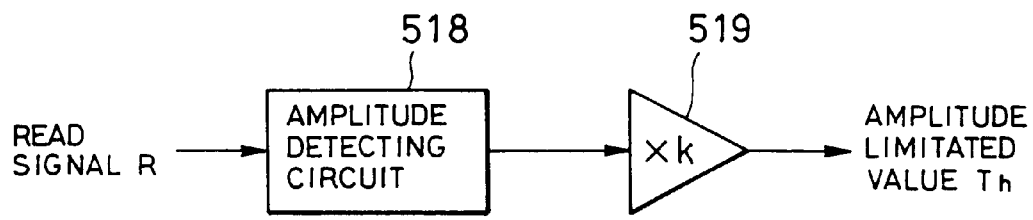
FIG. 16 is a diagram showing another example of an internal construction of the amplitude limitation value generating circuit 511.

In the amplitude limitation value generating circuit 511 shown in FIG. 16, the amplitude level of the read signal R is detected (amplitude detecting circuit 518) and a value obtained by multiplying the detected amplitude level by a predetermined value k (multiplier 519) is generated as an amplitude limitation value $T_h$.

Figure 17:
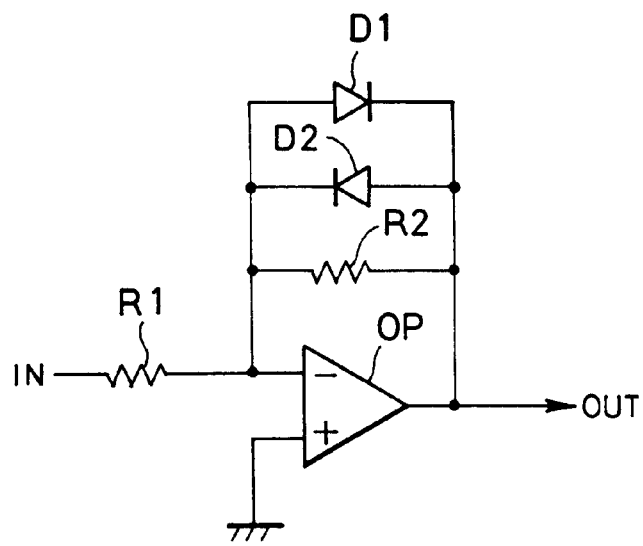
FIG. 17 is a diagram showing a construction of a limiter 510.

As a limiter 510 shown in FIGS. 11 and 13, an analog limiter as shown in FIG. 17 can be also used.

In the analog limiter shown in FIG. 17, when a level of an input signal IN is $$|(R2/R1) \cdot IN| < |V_d|$$

where, Vd represents the forward voltage of diodes D1 and D2, both of the diodes D1 and D2 are in an OFF state. The analog limiter, consequently, substantially operates as an inverting amplifier comprising resistors R1 and R2 and an operational amplifier OP.

That is, an output signal OUT is obtained by:

$$OUT = -(R2/R1) \cdot IN$$

When the level of the input signal IN satisfies the following relation:

$$-(R2/R1) \cdot IN | > V_d$$

since the diode D2 is forwardly biased and is made conductive, in this instance, the maximum level of the output signal OUT is limited by the forward voltage $V_d$ of the diode D2.

When the level of the input signal IN satisfies the following relation:

$$-(R2/R1) \cdot IN < -V_d$$

since the diode D1 is forwardly biased and is made conductive, in this instance, the minimum level of the output signal OUT is limited by $-V_d$.

Figure 18:
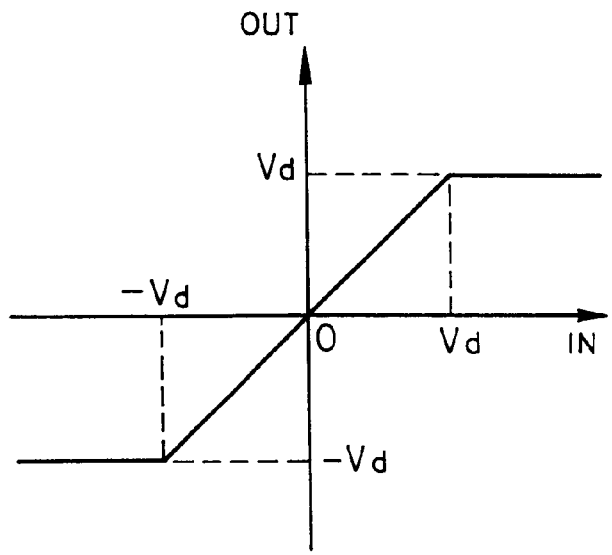
FIG. 18 is a diagram showing input/output characteristics of the limiter shown in FIG. 17.

By the operation as mentioned above, the analog limiter shown in FIG. 17 realizes the amplitude limitation for the read signal by the input/output characteristics as shown in FIG. 18.

Figure 19:
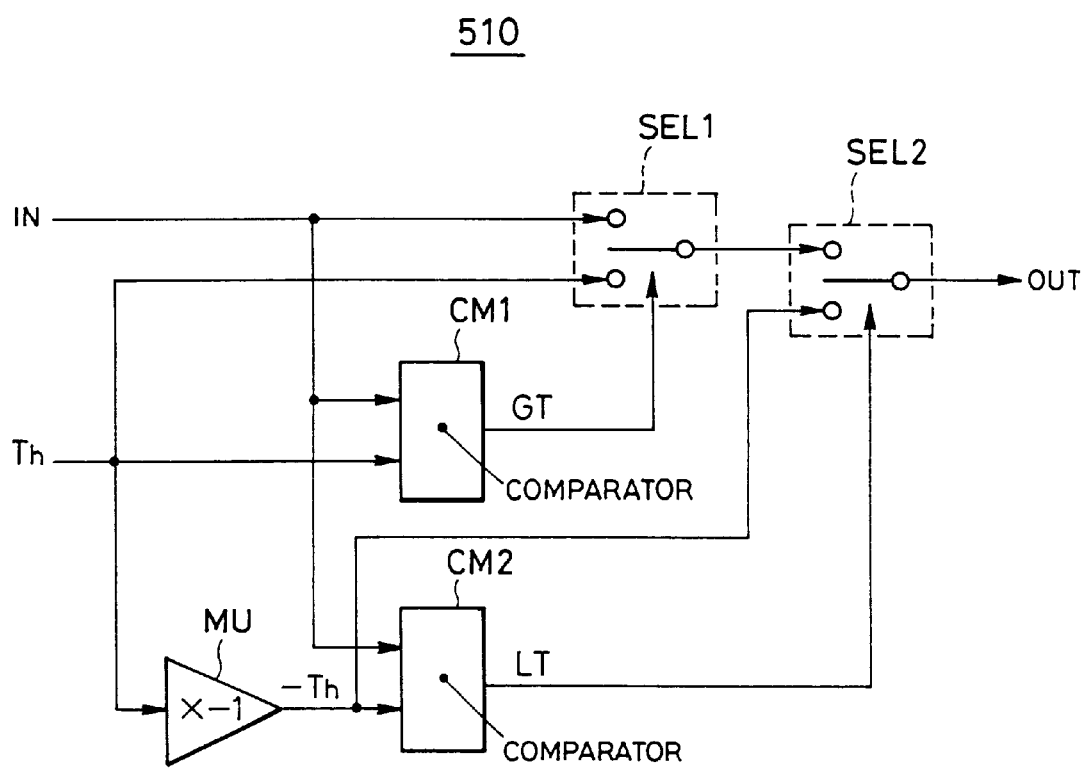
FIG. 19 is a diagram showing another construction of the limiter 510.

As a limiter 510 shown in FIGS. 11 and 13, a construction as shown in FIG. 19 can be also used.

In FIG. 19, a comparator CM1 compares the input signal IN with the amplitude limitation value $T_h$. When the input signal IN is larger than $T_h$, the comparator CM1 generates a comparison result signal GT at the logical level "1". When the input signal IN is smaller than $T_h$, the comparator CM1 generates the signal GT of the logical level "0". The comparator supplies the signal GT to a selector SEL1. The selector SEL1 alternatively selects either one of the input signal IN and the amplitude limitation value $T_h$ according to the logical level of the comparison result signal GT and supplies it to a selector SEL2. That is, the selector SEL1 selects the amplitude limitation value $T_h$ and supplies it to the selector SEL2 when the comparison result signal GT is at the logical level "1", namely, in the case where the input signal IN between the input signal IN and amplitude limitation value $T_h$ is larger than $T_h$. The selector SEL1 selects the input signal $IN_h$ and supplies it to the selector SEL2 when the comparison result signal Gt is at the logical level "0", namely, in the case where the input signal IN between the input signal IN and amplitude limitation value $T_h$ is smaller than $T_h$.

A multiplier MU obtains the amplitude limitation value $-T_h$ in which the polarity of the amplitude limitation value $T_h$ is inverted by multiplying the amplitude limitation value $T_h$ by "-1" and supplies it to the selector SEL2 and a comparator CM2. The comparator CM2 compares the input signal IN with the amplitude limitation value $-T_h$. When the input signal IN is smaller than $-T_h$, the comparator CM2 generates a comparison result signal LT of the logic level "1". When the input signal IN is larger than $-T_h$, the comparator CM2 generates the comparison result signal LT of the logical level "0". The comparator CM2 supplies the signal LT to the selector SEL2. The selector SEL2 alternatively selects either one of the value supplied from the selector SEL1 and the amplitude limitation value $-T_h$ according to the logical level of the comparison result signal LT and generates it as an output signal OUT. That is, the selector SEL2 generates the amplitude limitation value $-T_h$ when the comparison result signal LT is at the logical level "1", namely, in the case where the input signal IN between the input signal IN and amplitude limitation value $-T_h$ is smaller than $-T_h$. The selector SEL2 generates the value supplied from the selector SEL1 when the comparison result signal LT is at the logical level "0", namely, in the case where the input signal IN is larger than $-T_h$.

With the above construction. in the limiter shown in FIG. 19, the amplitude limitation for the read signal R is realized by the following input/output characteristics.

When $|IN|<T_h$, OUT=IN

When $IN>T_h$, $OUT=T_h$

When $IN<-T_h$, $OUT=-T_h$

As another method of realizing the amplitude limiting circuit 51, there is a method of using an ROM having a memory table in which non-linear input/output characteristics as shown in FIG. 2 or 3 are replaced to the relation of the address/read data.

Figures 20, 21:
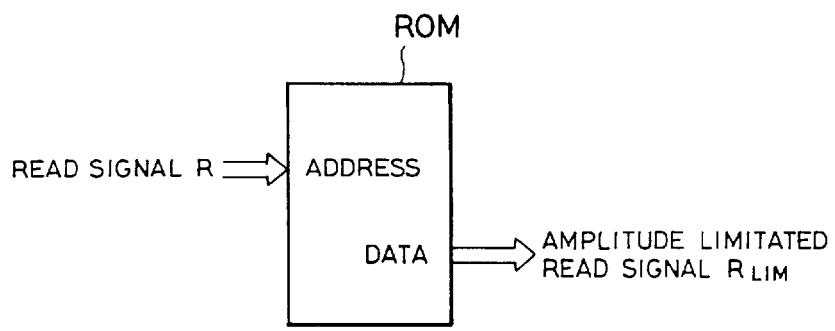
FIGS. 20 and 21 are diagrams showing another construction of the limiter 510.

FIG. 20 is a diagram showing an example of a construction of the amplitude limiting circuit 51 embodied by using the ROM as mentioned above. FIG. 21 is a diagram showing an example of a memory table of the ROM.

As still another method of realizing the amplitude limiting circuit 51, there is a method of using an A/D converter. In this instance, a flash type is used as an A/D converter and a conversion table of an encoding circuit provided for the A/D converter is modified as shown in FIG. 21. That is, for an output out of a range of the amplitude limitation values $T_h$ to $-T_h$, a conversion table for converting the output to a fixed value of the amplitude limitation value $T_h$ or $-T_h$ is used.

In the embodiment, although an example of using the FIR filter as a high-frequency emphasizing filter 52 has been shown, an analog high-frequency emphasizing filter can be also used. Further, although the method of preventing the occurrence of a jitter according to an excessive high-frequency emphasis has been described in the invention, for example, the invention can be also applied to a case of preventing the occurrence of a jitter by an excessive attenuation of the high frequency. In this instance, it is sufficient to use a low pass filter to cut frequencies higher than the shortest wavelength signal (run length 3T) as a high-frequency emphasizing filter 52.

What is claimed is:

1. A waveform equalizer for obtaining an equalization correction read signal by performing a waveform equalization to a read signal recorded on a recording medium, comprising:

amplitude limiting means that limits an amplitude level of said read signal to a predetermined amplitude limitation value and outputs an amplitude limitation read signal; and a filter that applies a filtering process to said amplitude limitation read signal to generate said equalization correction read signal;

wherein the predetermined amplitude limitation value is lower than an amplitude level of a read signal corresponding to recording data having a second shortest interval next to a minimum inversion interval.

2. A waveform equalizer according to claim 1, wherein said amplitude limiting means obtains an average value of sampling values before and after a zero-cross time point of said read signal and sets said average value as said amplitude limitation value.

3. A waveform equalizer according to claim 2, further comprising a variable gain amplifier for adjusting a signal level of said read signal so that said average value equals a predetermined value.

4. A waveform equalizer according to claim 1, wherein said filter is an FIR filter having tap coefficients (-k, k, 1, k, -k).

5. A waveform equalizer as claimed in claim 1, wherein said filter comprises a filter that enhances a signal corresponding to recorded data having said minimum inversion interval.

6. A waveform equalizer as claimed in claim 1, further comprising a pre-filter that performs a filtering process on said read signal supplied to said amplitude limiting means.

7. A waveform equalizer as claimed in claim 1, wherein said predetermined amplitude limitation value is greater than or equal to an amplitude level of a read signal corresponding to recording data having said minimum inversion interval.

8. A waveform equalizer as claimed in claim 1, in which the recording medium encodes the read signal using a Run Length Limited code.

9. A waveform equalizer for obtaining an equalization correction read signal by performing a waveform equalization to a read signal recorded on a recording medium, comprising:

a first filter that applies a filtering process to said read signal;

amplitude limiting means that limits an amplitude level of said read signal to a predetermined amplitude limitation value and outputs an amplitude limitation read signal;

a second filter that applies a filtering process to said amplitude limitation read signal; and an adder that adds the signals output by each of said first and second filters to produce an addition result and to generate said equalization correction read signal based on the addition result;

wherein the predetermined amplitude limitation value is lower than an amplitude level of a read signal corresponding to recording data having a second shortest interval next to a minimum inversion interval.

10. A waveform equalizer according to claim 9, wherein said filter is an FIR filter having tap coefficients (-k, k, 0, k, -k).

11. A waveform equalizer as claimed in claim 9, wherein said first filter functions to equalize delay times of output signals of said first and second filters respectively.

12. A waveform equalizer as claimed in claim 9, wherein said second filter comprises a filter that enhances a signal corresponding to recorded data having said minimum inversion interval.

13. A waveform equalizer as claimed in claim 9, further comprising a pre-filter that performs a filtering process on said read signal supplied to said amplitude limiting means.

14. A waveform equalizer as claimed in claim 9, in which the recording medium encodes the read signal using a Run Length Limited code.

* * * * *